(12) United States Patent
Javali (10) Patent No.: US 11,443,227 B2
(45) Date of Patent: Sep. 13, 2022

(54) SYSTEM AND METHOD FOR COGNITIVE MULTILINGUAL SPEECH TRAINING AND RECOGNITION

(71) Applicant: INTERNATIONAL BUSINESS MACHINES CORPORATION, Armonk, NY (US)

(72) Inventor: Praveen Javali, Murphy, TX (US)

(73) Assignee: International Business Machines Corporation, Armonk, NY (US)

(*) Notice: Subject to any disclaimer, the term of this patent is extended or adjusted under 35 U.S.C. 154(b) by 1203 days.

(21) Appl. No.: 15/941,058

(22) Filed: Mar. 30, 2018

(65) Prior Publication Data
US 2019/0303797 A1 Oct. 3, 2019

(51) Int. Cl.
G06F 3/048 (2013.01)
G06N 20/00 (2019.01)
G10L 15/06 (2013.01)
G09B 5/06 (2006.01)
G10L 15/187 (2013.01)
G09B 19/06 (2006.01)
G10L 15/22 (2006.01)

(52) U.S. Cl.
CPC ............. *G06N 20/00* (2019.01); *G09B 5/065* (2013.01); *G09B 19/06* (2013.01); *G10L 15/063* (2013.01); *G10L 15/187* (2013.01); *G10L 15/22* (2013.01)

(58) Field of Classification Search
CPC ........ G06N 20/00; G09B 5/065; G09B 19/06; G10L 15/063; G10L 15/187; G10L 15/22; G10L 25/51; G06F 40/20; G06F 40/42
See application file for complete search history.

(56) References Cited

U.S. PATENT DOCUMENTS

| 6,434,524 B1* | 8/2002 | Weber ....................... G06F 3/16 |
| | | 704/E15.021 |
| 6,892,193 B2 | 5/2005 | Bolle et al. |
| 9,548,048 B1* | 1/2017 | Solh ....................... G06V 40/20 |
| 9,665,832 B2 | 5/2017 | Thieberger et al. |

(Continued)

OTHER PUBLICATIONS

The Guardian; Computer simulating 13-year-old boy becomes first to pass Turing test; URL: https://www.theguardian.com/tehcnology/2014/jun/08/super-computer-simulates-13-year-od-boy-passes-turing-test; retrieved from the Internet Dec. 14, 2017; 3 pages.

(Continued)

*Primary Examiner* — Mohamed Abou EL Seoud
(74) *Attorney, Agent, or Firm* — Schmeiser, Olsen & Watts, LLP; David Mattheis (57) ABSTRACT

The present invention provides a method and system for analyzing human speech during natural language processing interactions between humans and computers to aid in computer learning. The method processes human language tutorial videos each having a visual track, an audio track and captions. Multiple videos are simultaneously processed in parallel using stream processing to identify spoken words or phrases in the videos by comparing them with benchmark words/phrases stored on a computer. Confidence scores are determined for each of the spoken words/phrases which are assigned to a list of the benchmark words/phrases on the computer when a threshold value is met. A system administrator can identify spoken words/phrases to which the threshold value is not met.

20 Claims, 5 Drawing Sheets

(56) References Cited

U.S. PATENT DOCUMENTS

2015/0082349 A1* 3/2015 Ishtiaq ............... H04N 21/4316
                                                        725/40
2016/0035237 A1   2/2016 Nealon et al.
2017/0344899 A1  11/2017 Zimmerman

OTHER PUBLICATIONS

Pearson; Conversion Table of USA Grades to School Years; URL: www pearsonclinical.co.uk/Sitedownloads/Miscpdfs/Gradetoage.pdf; retrieved from the Internet Dec. 24, 2017; 1 page.

Mell, Peter et al.; "The NIST Definition of Cloud Computing;" National Institute of Standards and Technology; Special Publication 800-145; Sep. 2011; 7 pages.

* cited by examiner

SYSTEM AND METHOD FOR COGNITIVE MULTILINGUAL SPEECH TRAINING AND RECOGNITION

TECHNICAL FIELD

The invention relates generally to the field of analyzing human speech during natural language processing interactions between humans and computers, and in particular to a method and system for cognitive multilingual speech training and recognition of words and phrases by a computer system.

BACKGROUND

The accuracy of identifying multilingual words spoken by human beings from an audio component of a video recording using a cognitive computer system is low, for instance with an accuracy of less than 50%. When a computer system (i.e. a machine) is learning a language it is difficult to identify words and phrases solely from an audio component of a video recording. Pictures with captions help immensely since pictures can be distinguished relatively easily, and textual captions are easily read via optical character recognition. However spoken language with multi-person conversations is difficult for machines to comprehend, especially if the persons are speaking multiple different languages. Background noise, slang, accents and regional variations or dialects of the spoken words make it very difficult for machines to learn a spoken language. Accordingly there is a need for improved methods and systems for computers to accurately learn and identify spoken human languages and dialects.

SUMMARY

The present invention provides a method, and associated computer system and computer program product, for analyzing human speech during natural language processing interactions between humans and computers to aid in computer learning. The method processes human language tutorial videos each having a visual track, an audio track and captions. Multiple videos are simultaneously processed in parallel using stream processing to identify spoken words or phrases in the videos by comparing them with benchmark words/phrases stored on a computer. Confidence scores are determined for each of the spoken words/phrases which are assigned to a list of the benchmark words/phrases on the computer when a threshold value is met. A system administrator can identify spoken words/phrases to which the threshold value is not met.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

Natural Language Processing (NLP) is defined as the branch of computational linguistics concerned with the use of artificial intelligence to process natural languages, as in machine translation. Otherwise said, natural language processing is the ability of a computer program to understand human language as it is spoke, and it is a component of artificial intelligence The development of NLP applications is challenging because computers traditionally require humans to communicate with them in a programming language that is precise, unambiguous and highly structured, or through a limited number of clearly enunciated voice commands. Human speech, however, is not always precise. It is often ambiguous and the linguistic structure can depend on many complex variables, including slang, regional dialects and social context.

Natural language processing allows users to query data sets in the form of a question that they might pose to another person. The computer/machine interprets the important elements of the human language sentence, such as those that might correspond to specific features in a data set, and returns an answer. Google™ and other search engines base their machine translation technology on NLP deep learning models. This allows algorithms to read text on a webpage, interpret its meaning and translate it to another language.

The current inventive method is used to train cognitive computer systems to learn human languages with all the varying dialects and slangs. Current speech to text translation depends on very well spoken language styles, such as the formal 'Queens English', or equally well spoken Spanish. Even with proper language pronunciations, translational accuracy drops rapidly when two or more speakers are present, or in the case of a multilingual conversation. The goal of the inventive methods is to strengthen the Natural Language Processing in machine learning to a point where the machine (computer) can learn more rapidly from videos such as elementary school videos with captions. This type of automated learning faster, more continuous translations and learning by the machine. Only briefly would a human intervention (curation) be required to correct the understanding of a word or phrase meanings in relation to spoken word or phrase pronunciations, and human intervention would be required much less frequently over time. The curation would preferably occur in weekly or monthly reports, and/or upon monitoring and recognition of low confidence scores of translations. In this way a single cognitive machine (artificial intelligence) based natural language processor could rapidly learn by continuously consuming hundreds or thousands of training videos of the same language. Mass training/learning occurs with translations of multiple dialects and accents of multiple languages all at the same time by a centralized computer/machine.

Use examples of computers which have implemented the intelligent natural language processing system and method of the current invention include:

1) Automated computerized machines that listen to human voices in all scenarios, even noisy situations, and still understand the spoken words or phrases. For instance, voice based autonomous car driving which can respond to human vocal commands, e.g. to change a target location from the nearest restaurant to the nearest gas station.

2) Automated call centers which respond to human voices.

3) Computerized medical equipment such as for caring for patients during convalescence.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
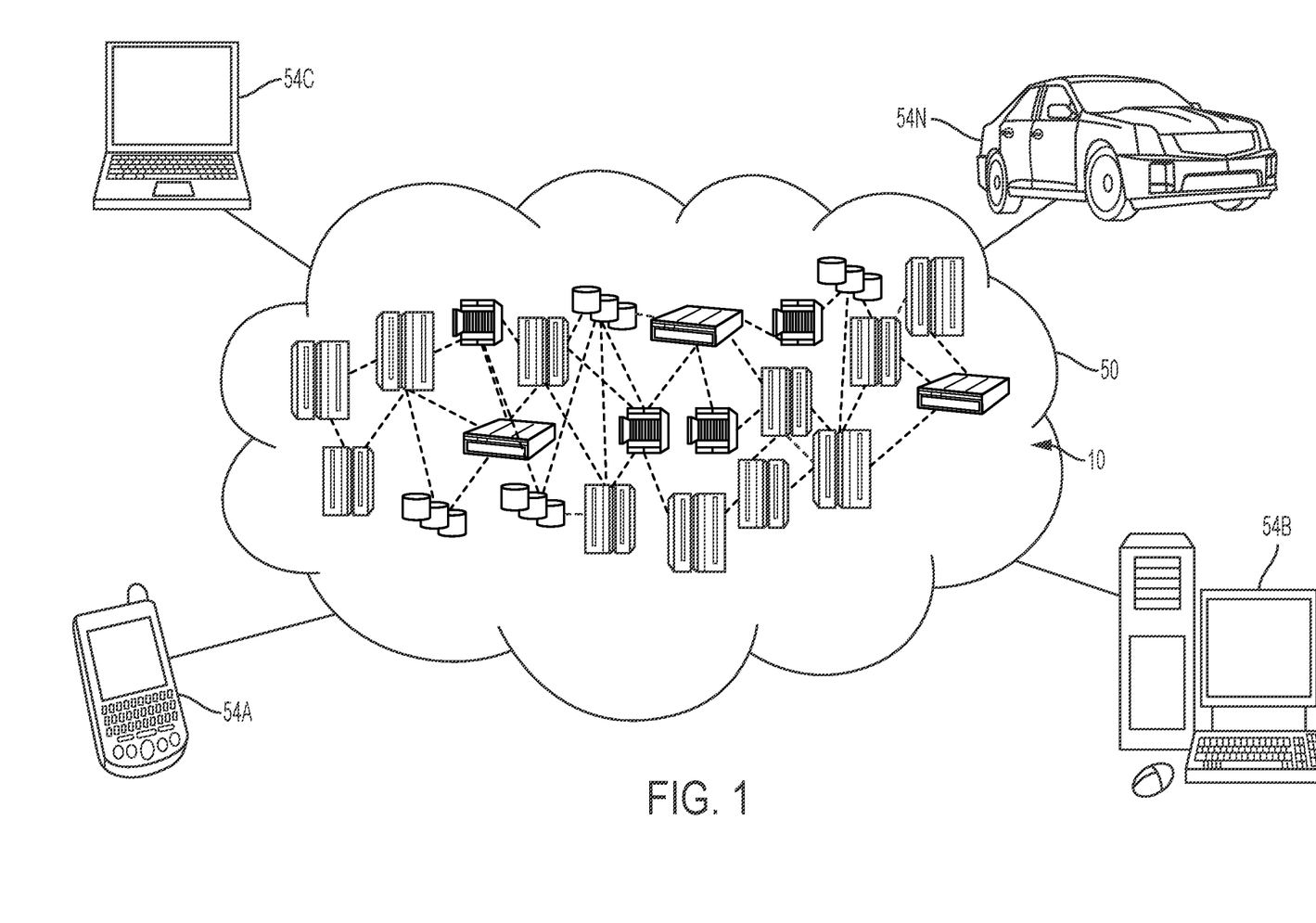
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
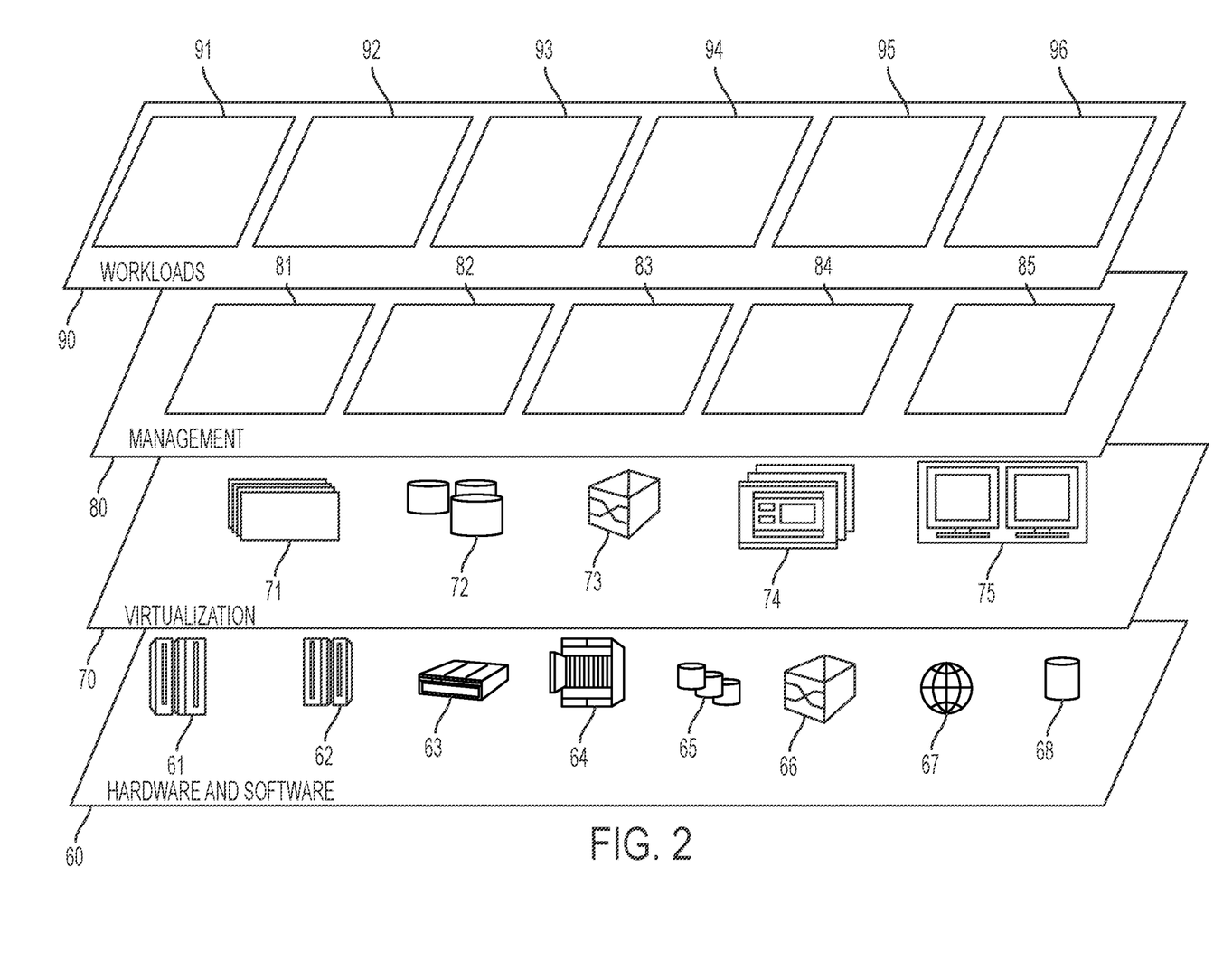
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analyzing human speech during natural language processing interactions between humans and computers 96.

Figure 3:
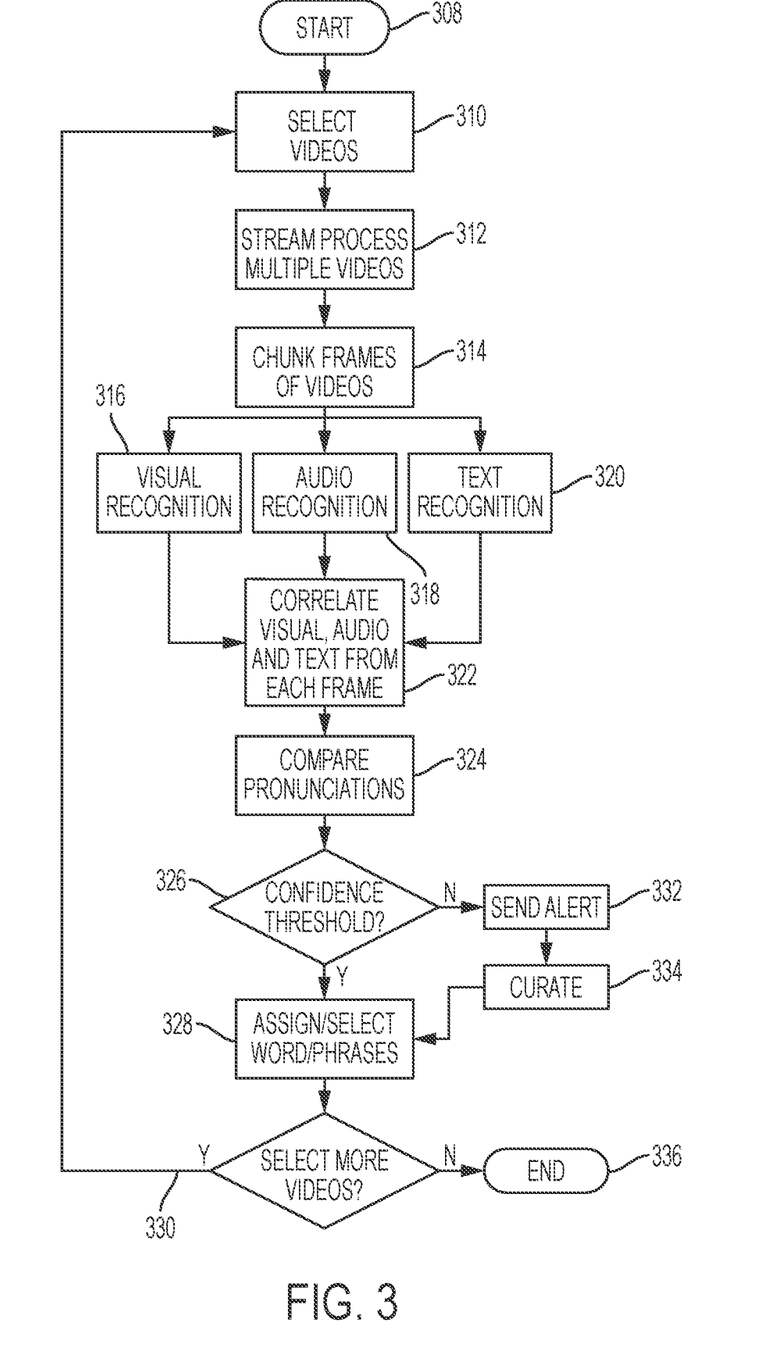
FIG. 3 is a flow chart diagram of a method in accordance with embodiments of the present invention.

FIG. 3 is a flow chart diagram of a method in accordance with embodiments of the present invention. The method starts in step 308, and in step 310 a plurality of human language tutorial videos are selected and provided to a computing system. A human language tutorial video is defined herein as a video recording which includes (1) a visual track or portion, (2) a corresponding audio track or portion including spoken words/phrases by a human voice, and (3) a corresponding textual track or caption of the words/phrases being spoken. The human language tutorial video can represent any spoken human language or combination of languages including any dialects or derivatives of the spoken word. Any video with the above components can be provided to the computing system in step 310 which selects multiple videos of the plurality of human language tutorial videos for language analysis. In one example, the plurality of human language tutorial videos are elementary school videos for learning language skills. However, a language tutorial video is not limited to videos which were created for the purpose of teaching a language. Rather, any video containing the three above-described features can be considered a human language tutorial video. For instance a movie as shown on television or in a movie theater having textual captions (subtitles) of spoken words/phrases by actors in one or more languages can constitute a human language tutorial video.

The selected multiple videos care simultaneously processed in parallel tracks. The computing system or computer can be stand-alone, a server, a group of interconnected computers, a network, laptop, desktop, smart phone, tablet or any other type of computerized device(s). The device for providing the plurality of human language tutorial videos can be any known device or combination of devices such as a database, a network, files, computers, a server, or any other type of computerized device(s) for transferring data.

Each of the plurality of human language tutorial videos includes a visual track and a corresponding audio track with captions corresponding to the visual and audio tracks. The captions could be contained in the video track or in a separate caption track. The visual track contains visual information, the audio track contains pronunciations of words/phrases spoken by humans regarding the visual information, and the captions include text of the audio track. For instance, a simple video could have a photo of an apple with the caption "APPLE" beneath the photo and a corresponding audio track of a human voice saying "apple" in English while the photo and caption are displayed. Preferably the audio track would repeat the word "apple" three times since repetitions of a word pronunciation have proven to be helpful in accurate identification of the associated word. If the video was a Spanish instructional video, then the caption would read "MANZANA" and the human voice of the audio track would say "manzana" while the photo and caption are contemporaneously displayed. Phrases could also be identified rather than individual words. For instance, the phrase "a drop in a bucket" may be a familiar, often used phrase which would be identified as a whole phrase rather than from each individual word.

The multiple human language tutorial videos selected by the computing system in step 310 are simultaneously stream processed in step 312 in parallel channels by the computing system. Stream processing is a well known computer programming paradigm that allows simultaneous parallel processing of multiple instructional videos. In step 312 stream processing is used, by the computer system, to simultaneously process videos in parallel channels using multiple processing modules. The stream processing by the computing system in step 314 chunks frames of the multiple videos into the parallel processing modules, where each processing module includes a video recognition module for analyzing and identifying the visual information in step 316, a text recognition module using optical character recognition to analyze and identify the text of the captions in step 320, and an audio recognition module for analyzing and identifying in step 318 the pronunciations of the words spoken by the humans in the corresponding audio track.

Step 322 correlates, by correlation modules of the computer system for each frame of the multiple videos, the identified visual information with the identified captions and the identified pronunciations of the spoken words. In other words according to step 322 the timing in the system is coordinated so that frames containing visual information of an apple are contemporaneously processed with a text caption "APPLE" and an audio track pronunciation of the word "apple".

In step 324 the pronunciation of each spoken word or phrase is identified by the audio recognition module in step 318 is compared with benchmark word or phrase pronunciations stored in files, a database, memory or elsewhere on a computer. The benchmark word or phrase pronunciations are established accepted pronunciations of words or phrases for a given human language which are used for Natural Language Processing (NLP) by the computing system. In order for the computing system to ensure the accurate identification of the pronunciations of the spoken words or phrases identified in step 318, each spoken word or phrase pronunciation is compared in step 324 with a list of pronunciations of benchmark words and phrases stored on the computer. A confidence score is determined for each identified spoken word or phrase pronunciation in comparison to the benchmark word or phrase pronunciations stored on the computer. For instance, the confidence scores could range from 1 to 100, where 1 is the lowest possible score indicating no confidence that the spoken word or phrase pronunciation equates to the identified pronunciation of a benchmark word or phrase stored on the computer, and 100 is the highest possible score indicating absolute confidence that the spoken word or phrase pronunciation is equivalent to the identified pronunciation of a benchmark word or phrase stored on the computer.

In step 326 a determination is made whether the confidence score for a spoken pronunciation of an identified word or phrase meets a predetermined threshold. For instance a predetermined threshold value of 75 can be selected on a scale of 1-100 whereby any word or phrase pronunciation with a confidence score of 75 to 100 will be considered as a valid pronunciation of the benchmark word or phrase stored on the computer. In the current example if the person speaking on the video says the word "apple" so that it is recognized with a confidence score between 75-100 as being the written word "apple" identified on the computer as a benchmark word, then that person's pronunciation will be added to the list of pronunciations stored on the computer for the word "apple". For instance, a person from the deep south in the United States would likely pronounce the word "apple" with a different accent or dialect than a person from New York City, or a French national having a French accent. If the person from the south received a confidence score of 80, the person from New York city received a confidence score of 90 and the French national received a confidence score of 75, then each of the three pronunciations would meet the confidence score threshold for inclusion into the computer files/database. In step 328 each of these three varying pronunciations would be assigned to the list of pronunciations stored on the computer for the word "apple". The list would be numerically organized so that word pronunciations with higher confidence scores would be high on the list and pronunciations with lower confidence scores would be lower on the list. The above example of determining a confidence score for a spoken word is equally applicable to a spoken phrase, such as, "fits like a glove".

If the confidence threshold is not met in step 326, then an alert is sent in step 332 for curating assistance. The alert could be an audio alert or alarm, a pop-up or other visual indicator on a computer screen, a message sent to an administrator(s), or any other known method of notification. Preferably the curator is a human administrator who in step 334 will listen to the pronunciation from the language tutorial video and compare it to various word or phrase pronunciations stored on the computer. For instance if a person with a heavy backwoods accent/dialect pronounces the word "apple" in such a way that a confidence score of 60 is registered (e.g. below the predetermined threshold of 75), then the human curator is alerted and can listen to the backwoods pronunciation to compare it to known pronunciations of the benchmark word listed and stored on the computer. Also the curator may be able to independently identify the questionable pronunciation from his own experience and knowledge, or from the context in which the word is used in the language tutorial video. For instance the questionable pronunciation may have been incorrectly identified by the audio recognition module to correspond to the word "apple" rather than the word "able" which the curator could determine. Once the curator has identified the questionable word pronunciation with respect to a known benchmark word, then the curator in step 328 can choose to assign and add the pronunciation to the list of acceptable pronunciations of the word stored on the computer. Alternatively the curator could dispose of the questionable pronunciation to the trash bin if he feels unsure that the pronunciation corresponds to a specific identifiable benchmark word. In one example the questionable pronunciation could be a new word altogether, or a new variety of a known benchmark word (e.g. run, running, runner, runs, ran, etc.). In this situation the curator can generate a new word to be stored on the computer and assign the questionable pronunciation to the new word.

In step 330 the computer system determines whether to select additional different human language tutorial videos from the plurality of human language tutorial videos, thereafter repeating the above steps 312 through 328 to act upon the selected different videos. This option can be provided in order to select and process a predetermined number of videos (e.g. 1000 videos), or the selection of additional videos can be contingent upon variables or data such as to process all videos from a specific batch, or from a specific source. Further, selection and processing can continue until all available videos of the plurality of human language tutorial videos are processed at which time a flag can indicate that there are no more videos available for processing. When processing of the selected videos is complete, then the method ends in step 336.

The different human language tutorial videos selected for processing can include videos having the same visual information and the same captions as previously processed videos, but with audio tracks different from the audio tracks of the previously processed videos. The different audio tracks vary for reasons such as, but not limited to, the use of different voices, different pronunciations, different language dialects, or different combinations of languages of words or phrases spoken by the humans. By processing similar videos with different accents, dialects, etc. the computer can learn the pronunciations of various accents and dialects related to specific words and phrases. Also the human language tutorial videos can have different audio background noise, or background noise or human voice of different volumes from previously processed videos. The combined use of visual data, audio data and captions for each frame provides a high likelihood of success in accurately translating the spoken words and/or phrases of the video. Moreover the use of stream processing with parallel channels provides faster learning for the computer of voluminous amounts of data.

The present invention provides the advantage of mass rapid translation of multiple videos in multiple parallel channels for faster Natural Language Processing using stream processing as previously described to train or educate the language skills and understanding of a computer system. Using the current invention the number of videos that can be simultaneously processed is increased to as many parallel channels as feasible depending on the computational limitations of the computer.

One implementation example of the inventive method is to upgrade the brilliant Watson computer system that was developed by IBM' to parse questions into different keywords and sentence fragments in order to find statistically related phrases. Watson's main innovation was not in the creation of a new algorithm for this operation but rather its ability to quickly execute hundreds of proven language analysis algorithms simultaneously. The more algorithms that find the same answer independently the more likely Watson is to be correct. Once Watson has a small number of potential solutions, it is able to check against its database to ascertain a statistical likelihood whether the solution is accurate. The current system would enhanced the knowledge base of Watson by increasing the understanding of all human language dialects, pronunciations, accents and slang words for every human language.

According to the present invention a computing system can quickly and accurately learn multiple languages, dialects, accents, pronunciations, etc. to more accurately communicate with human beings using vocal and written human language skills. For instance today a computerized system for doing things like turning on/off lights, electrical appliances, locking doors, etc. can be controlled by a human voice, although typically the computer must learn to identify a specific person's voice or pronunciations (e.g. the Queen's English). A computer using the current inventive method would learn thousands of dialects, accents, pronunciations and variations of any given word in any given language, thus providing more efficient and accurate Natural Language Processing interactions between a person and a computer. For example if a captain of a ship spoke verbal navigational commands to an automated navigation computing system trained according to the inventive method, the likelihood of error in understanding the commands from the captain would be minimized regardless of the captain's word pronunciations due to factors such as, but not limited to, his accent, dialect or nationality.

Computer learning by translating large numbers of language translation videos is accomplished to maximize translational accuracy in view of the three-tiered approach of the inventive method, i.e. using video recognition, audio recognition and textual captions of corresponding frames of the video. A human language tutorial video is defined herein as a video recording which includes a visual track or portion, a corresponding audio track or portion including spoken words by a human voice, and a corresponding textual track or caption of the words being spoken. Any video with the above components can be provided to the computing system for language analysis. Moreover, the language tutorial video is not limited to videos which were created for the purpose of teaching a language. Rather for the purposes of this invention, any video containing the three above-described features can be considered a human language tutorial video. For instance a movie as shown on television or in a movie theater having textual captions (subtitles) of spoken words by actors in one or more languages can constitute a human language tutorial video.

Figure 4:
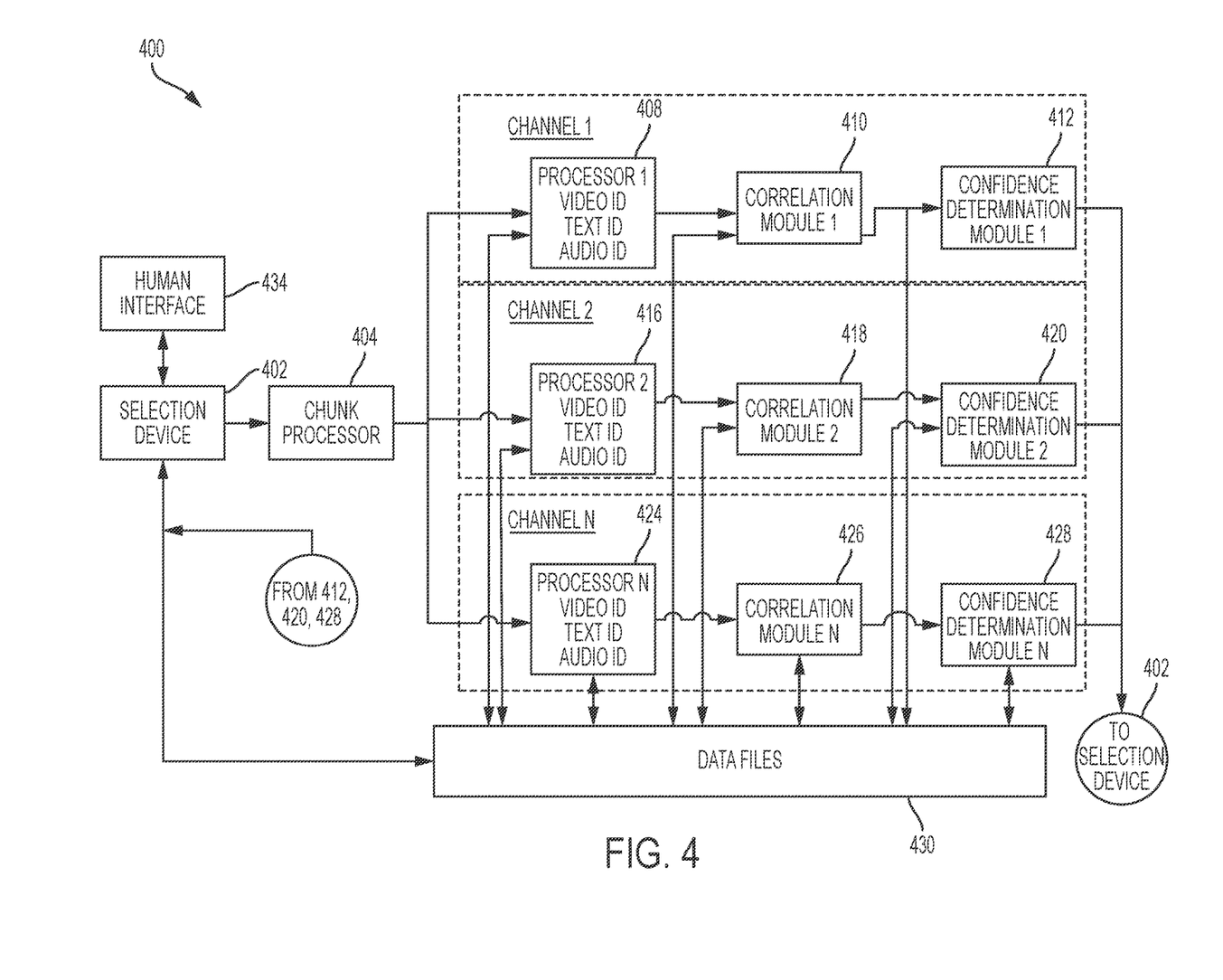
FIG. 4 illustrates a first embodiment of a computer system used for implementing the methods of the present invention.

FIG. 4 illustrates a first embodiment of a computer system 400 used for implementing the methods of the present invention. Video files can be stored on the computer system 400 such as in a database or files 430, or in another storage device such as on a remote server or depository. In fact all of the components, devices and modules used to implement the current inventive methods can be stored on a single computer or computing system 400, or various components can be stored on different computers, servers, remote devices, etc.

An input selection device 402 of the computer system 400 selects multiple human language tutorial videos from a plurality of human language tutorial videos available from the database(s) or data file(s) 430, or interconnected devices (for example remote files, depositories or servers). Each of the plurality of human language tutorial videos includes a visual track, a corresponding audio track and captions, wherein the visual track contains visual information, the audio track contains pronunciations of words or phrases spoken by humans regarding the visual information, and the captions include text of the spoken words or phrases of the audio track. The captions can be located on a separate caption track or they can be included on a visual track.

The computer 400 uses stream processing in parallel channels to simultaneously process the selected multiple videos. Chunk processor 404 chunks frames of the multiple videos into N processor devices or modules, where N is a positive digit. FIG. 4 illustrates N channels of parallel stream processing including channel 1, channel 2 . . . channel N. Each channel contains a respective processor (processors 1, 2 . . . N), a correlation device or module (correlation modules 1, 2 . . . N), and a confidence determination device or module (determination modules 1, 2 . . . N). Each module can be a module, chip, processor, device, hardware, software, or firmware for implementing the method steps defined herein.

A first video, video 1, of the N selected videos is processed in channel 1. Processor 1, i.e. module 408 in channel 1, includes a video recognition module (not shown) which analyzes each frame of a visual track of the first video 1 received from the chunk processor 404, then outputs a video ID identification for each frame of the first video 1. A text identification module (not shown) analyzes each frame of a text caption track of the first video 1 received from the chunk processor 404, then outputs a text ID (aka caption ID) for each frame of the first video 1. Finally, an audio recognition module (not shown) analyzes each frame of an audio track of the first video 1 received from the chunk processor 404, then outputs an audio ID for each frame of the first video 1.

A second video, video 2, of the N selected videos is processed in channel 2. Processor 2, i.e. module 416 in channel 2, includes a video recognition module (not shown) which analyzes each frame of a visual track of the second video 2 received from the chunk processor 404, then outputs a video ID identification for each frame of the second video 2. A text identification module (not shown) analyzes each frame of a text caption track of the second video 2 received from the chunk processor 404, then outputs a text ID (aka caption ID) for each frame of the second video 2. Finally, an audio recognition module (not shown) analyzes each frame of an audio track of the second video 2 received from the chunk processor 404, then outputs an audio ID for each frame of the second video 2.

An Nth video, video N, of the N selected videos is processed in channel N. Processor N, i.e. module 424 in channel N, includes a video recognition module (not shown) which analyzes each frame of a visual track of the Nth video N received from the chunk processor 404, then outputs a video ID identification for each frame of the Nth video N. A text identification module (not shown) analyzes each frame of a text caption track of the Nth video N received from the chunk processor 404, then outputs a text ID (aka caption ID) for each frame of the Nth video N. Finally, an audio recognition module (not shown) analyzes each frame of an audio track of the Nth video N received from the chunk processor 404, then outputs an audio ID for each frame of the Nth video N.

Each of the modules 408, 410, 412, 416, 418, 420, 424, 426, 428 of the computing system 400 is connected for communication with the data files 430 which could be local data file(s), or multiple storage devices at various remote locations.

In channel 1, processor 408 generates the video ID, text ID and audio ID for each frame of the first video 1. Those signals are correlated in a correlation module 1, aka correlation module 410, to ensure the timing of the signals so that the visual data, caption data and audio data of each frame correspond with one another. The correlated data is received by the confidence determination module 1, aka determination module 412, which determines confidence scores of accuracy for identifying the pronunciations of the spoken words or phrases, by comparing the identified audio pronunciations of the spoken words or phrases with a list of pronunciations of benchmark words or phrases stored in the data files 430 on the computer. Determination module 412 also assigns the identified pronunciations of the words or phrases having confidence scores equal to or above a predetermined threshold value to a list of pronunciations of benchmark words or phrases stored in the data files 430.

In channel 2, processor 416 generates the video ID, text ID and audio ID for each frame of the second video 2. Those signals are correlated in a correlation module 2, aka correlation module 418, to ensure the timing of the signals so that the visual data, caption data and audio data of each frame correspond with one another. The correlated data is received by the confidence determination module 2, aka determination module 420, which determines confidence scores of accuracy for identifying the pronunciations of the spoken words or phrases, by comparing the identified audio pronunciations of the spoken words or phrases with a list of pronunciations of benchmark words or phrases stored in the data files 430 on the computer. Determination module 420 also assigns the identified pronunciations of the words or phrases having confidence scores equal to or above a predetermined threshold value to a list of pronunciations of benchmark words or phrases stored in the data files 430.

In channel N, processor 424 generates the video ID, text ID and audio ID for each frame of the Nth video N. Those signals are correlated in a correlation module N, aka correlation module 426, to ensure the timing of the signals so that the visual data, caption data and audio data of each frame correspond with one another. The correlated data is received by the confidence determination module N, aka determination module 428, which determines confidence scores of accuracy for identifying the pronunciations of the spoken words or phrases, by comparing the identified audio pronunciations of the spoken words or phrases with a list of pronunciations of benchmark words or phrases stored in the data files 430 on the computer. Determination module 428 also assigns the identified pronunciations of the words or phrases having confidence scores equal to or above a predetermined threshold value to a list of pronunciations of benchmark words or phrases stored in the data files 430. In the event that pronunciations of words or phrases have a confidence score below the predetermined threshold value, then a signal, flag or alert can be generated to alert a human administrator that curation is necessary to aid in identifying the word or phrase in question.

Upon completion of processing in modules 412, 420, 428, signals are sent back from each of the modules to the selection device 402 to indicate that, either curation is requested by an administrator for word or phrase identification, or the processing is complete so that more videos can be selected for processing.

Figure 5:
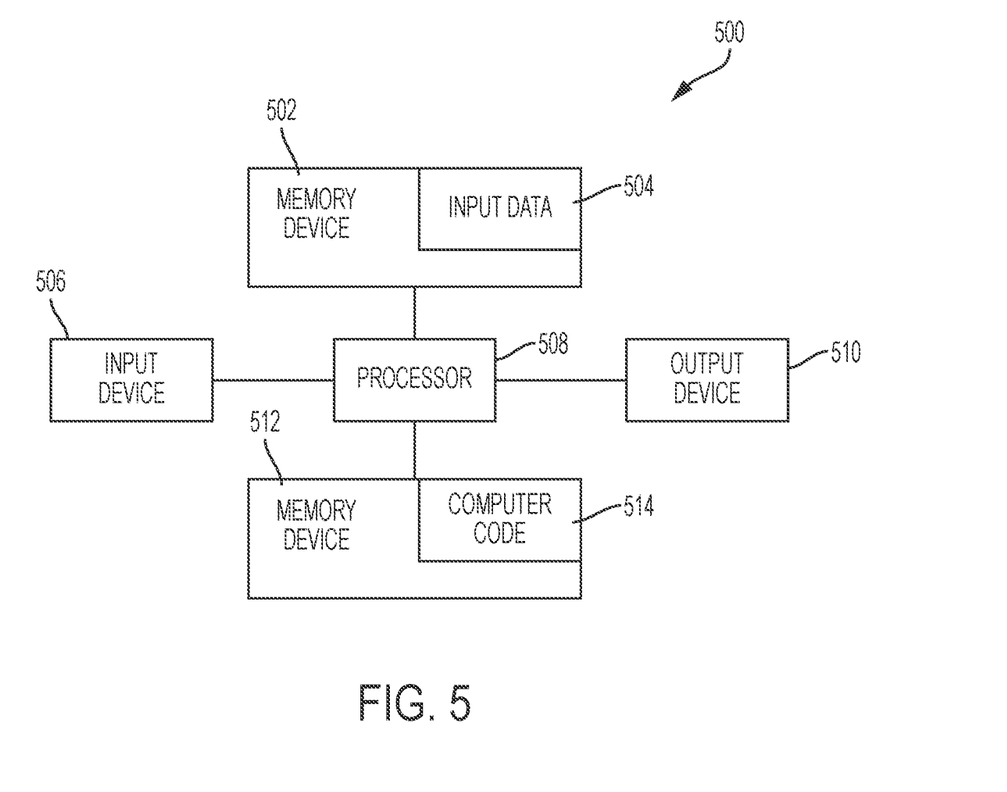
FIG. 5 illustrates a second embodiment of a computer system used for implementing the methods of the present invention.

FIG. 5 is a block diagram of a computer system, aka computing device, 500 for analyzing human speech during natural language processing interactions between humans and computers in accordance with embodiments of the present invention. The computing device 500 includes a processor 508, an input device 506 coupled to the processor 508, an output device 510 coupled to the processor 508, and memory devices 502 and 512 each coupled to the processor 508. The input device 506 may be, inter alia, a keyboard, a mouse, etc. The output device 510 may be, inter alia, a printer, a plotter, a computer screen, a magnetic tape, a removable hard disk, a floppy disk, etc. The memory devices 502 and 512 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 512 includes a computer code 514 which is a computer program that includes computer-executable instructions.

The computer code 514 includes software or program instructions that may implement an algorithm for implementing methods of the present invention. The processor 508 executes the computer code 514. The memory device 502 includes input data 504. The input data 504 includes input required by the computer code 514. The output device 510 displays output from the computer code 514. Either or both memory devices 502 and 512 (or one or more additional memory devices not shown) may be used as a computer usable storage medium (or program storage device) having a computer readable program embodied therein and/or having other data stored therein, wherein the computer readable program includes the computer code 514.

Generally, a computer program product (or, alternatively, an article of manufacture) of the computer system/device 500 may include the computer usable storage medium (or said program storage device). The processor 508 may represent one or more processors. The memory device 502 and/or the memory device 512 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of analyzing human speech during natural language processing interactions between humans and computers, the method comprising:
   (A) selecting, by a computer system, multiple human language tutorial videos from a plurality of human language tutorial videos, each of the plurality of human language tutorial videos having a visual track, a corresponding audio track and captions, wherein the visual track contains visual information, the audio track contains pronunciations of words or phrases spoken by humans regarding the visual information, and the captions include text of the spoken words or phrases of the audio track;
   (B) stream processing simultaneously in parallel channels, by the computer system, the selected multiple human language tutorial videos by chunking frames of the multiple videos into processor modules, said processor modules each including a video recognition module, a text recognition module, and an audio recognition module, wherein for each said frame of the multiple videos said video recognition module analyzes and identifies the visual information of the video track, said audio recognition module analyzes and identifies the pronunciations of the spoken words or phrases of the audio track, and said text recognition module analyzes and identifies the captions using optical character recognition;
(C) correlating, by correlation modules of the computer system for each said frame of the multiple videos, the identified visual information with the identified captions and the identified pronunciations of the spoken words or phrases;
(D) determining, by determination modules of the computer system, confidence scores of accuracy in the identifying the pronunciations of the spoken words or phrases, by comparing the identified audio pronunciations of the spoken words or phrases with a list of pronunciations of benchmark words or phrases stored in files on the computer;
(E) assigning, by the computer system, the identified pronunciations of the words or phrases having confidence scores equal to or above a predetermined threshold value to the list of pronunciations of benchmark words or phrases stored in the files on the computer; and
(F) selecting, by the computer system, different human language tutorial videos from the plurality of human language tutorial videos, then repeating steps (B) through (E) on the selected different human language tutorial videos.

2. The method of claim 1, wherein the different human language tutorial videos include videos having same said visual information and same said captions as previously processed videos, and having audio tracks different from the audio tracks of the previously processed videos, said different audio tracks including different voices, different pronunciations, different language dialects, or different combinations of languages of said words or phrases spoken by the humans.

3. The method of claim 1, wherein the different human language tutorial videos include audio tracks having different audio background noise from the previously processed videos.

4. The method of claim 1, wherein the plurality of human language tutorial videos are elementary school videos for learning language skills.

5. The method of claim 1, further comprising:
sending an alert, by the computer, to request a human curator to assist in understanding pronunciations of the identified words or phrases having confidence scores below the predetermined threshold value; and
assigning, by the human curator, the identified pronunciations of the spoken words or phrases having confidence scores below the predetermined threshold value to the list of pronunciations of benchmark words or phrases stored in the files on the computer.

6. The method of claim 1, wherein the audio track for one of the selected human language tutorial videos includes pronunciations of words or phrases from multiple human languages, dialects, or human accents.

7. The method of claim 1, wherein the captions are included on the visual track with the visual information.

8. A computer program product, comprising one or more computer readable hardware storage devices having computer readable program code stored therein, said program code containing instructions executable by a computing device to implement a method of analyzing human speech during natural language processing interactions between humans and computers, the method comprising:
(A) selecting, by a computer system, multiple human language tutorial videos from a plurality of human language tutorial videos, each of the plurality of human language tutorial videos having a visual track, a corresponding audio track and captions, wherein the visual track contains visual information, the audio track contains pronunciations of words or phrases spoken by humans regarding the visual information, and the captions include text of the spoken words or phrases of the audio track;
(B) stream processing simultaneously in parallel channels, by the computer system, the selected multiple human language tutorial videos by chunking frames of the multiple videos into processor modules, said processor modules each including a video recognition module, a text recognition module, and an audio recognition module, wherein for each said frame of the multiple videos said video recognition module analyzes and identifies the visual information of the video track, said audio recognition module analyzes and identifies the pronunciations of the spoken words or phrases of the audio track, and said text recognition module analyzes and identifies the captions using optical character recognition;
(C) correlating, by correlation modules of the computer system for each said frame of the multiple videos, the identified visual information with the identified captions and the identified pronunciations of the spoken words or phrases;
(D) determining, by determination modules of the computer system, confidence scores of accuracy in the identifying the pronunciations of the spoken words or phrases, by comparing the identified audio pronunciations of the spoken words or phrases with a list of pronunciations of benchmark words or phrases stored in files on the computer;
(E) assigning, by the computer system, the identified pronunciations of the words or phrases having confidence scores equal to or above a predetermined threshold value to the list of pronunciations of benchmark words or phrases stored in the files on the computer; and
(F) selecting, by the computer system, different human language tutorial videos from the plurality of human language tutorial videos, then repeating steps (B) through (E) on the selected different human language tutorial videos.

9. The computer program product of claim 8, wherein the different human language tutorial videos include videos having same said visual information and same said captions as previously processed videos, and having audio tracks different from the audio tracks of the previously processed videos, said different audio tracks including different voices, different pronunciations, different language dialects, or different combinations of languages of said words or phrases spoken by the humans.

10. The computer program product of claim 8, wherein the different human language tutorial videos include audio tracks having different audio background noise from the previously processed videos.

11. The computer program product of claim 8, wherein the plurality of human language tutorial videos are elementary school videos for learning language skills.

12. The computer program product of claim 8, wherein the method further comprises:
sending an alert, by the computer, to request a human curator to assist in understanding pronunciations of the identified words or phrases having confidence scores below the predetermined threshold value; and assigning, by the human curator, the identified pronunciations of the spoken words or phrases having confidence scores below the predetermined threshold value to the list of pronunciations of benchmark words or phrases stored in the files on the computer.

13. The computer program product of claim 8, wherein the audio track for one of the selected human language tutorial videos includes pronunciations of words or phrases from multiple human languages, dialects, or human accents.

14. The computer program product of claim 8, wherein the captions are included on the visual track with the visual information.

15. A system, comprising a computing device, said computing device comprising one or more processors, one or more memories, and one or more computer readable hardware storage devices, said one or more hardware storage devices containing program code executable by the one or more processors via the one or more memories to implement a method of analyzing human speech during natural language processing interactions between humans and computers, the method comprising:
  (A) selecting, by a computer system, multiple human language tutorial videos from a plurality of human language tutorial videos, each of the plurality of human language tutorial videos having a visual track, a corresponding audio track and captions, wherein the visual track contains visual information, the audio track contains pronunciations of words or phrases spoken by humans regarding the visual information, and the captions include text of the spoken words or phrases of the audio track;
  (B) stream processing simultaneously in parallel channels, by the computer system, the selected multiple human language tutorial videos by chunking frames of the multiple videos into processor modules, said processor modules each including a video recognition module, a text recognition module, and an audio recognition module, wherein for each said frame of the multiple videos said video recognition module analyzes and identifies the visual information of the video track, said audio recognition module analyzes and identifies the pronunciations of the spoken words or phrases of the audio track, and said text recognition module analyzes and identifies the captions using optical character recognition;
  (C) correlating, by correlation modules of the computer system for each said frame of the multiple videos, the identified visual information with the identified captions and the identified pronunciations of the spoken words or phrases;
  (D) determining, by determination modules of the computer system, confidence scores of accuracy in the identifying the pronunciations of the spoken words or phrases, by comparing the identified audio pronunciations of the spoken words or phrases with a list of pronunciations of benchmark words or phrases stored in files on the computer;
  (E) assigning, by the computer system, the identified pronunciations of the words or phrases having confidence scores equal to or above a predetermined threshold value to the list of pronunciations of benchmark words or phrases stored in the files on the computer; and
  (F) selecting, by the computer system, different human language tutorial videos from the plurality of human language tutorial videos, then repeating steps (B) through (E) on the selected different human language tutorial videos.

16. The system of claim 15, wherein the different human language tutorial videos include videos having same said visual information and same said captions as previously processed videos, and having audio tracks different from the audio tracks of the previously processed videos, said different audio tracks including different voices, different pronunciations, different language dialects, or different combinations of languages of said words or phrases spoken by the humans.

17. The system of claim 15, wherein the different human language tutorial videos of the plurality of human language tutorial videos include audio tracks having different audio background noise from the previously processed videos.

18. The system of claim 15, wherein the plurality of human language tutorial videos are elementary school videos for learning language skills.

19. The system of claim 15, further comprising:
  sending an alert, by the computer, to request a human curator to assist in understanding pronunciations of the identified words or phrases having confidence scores below the predetermined threshold value; and
  assigning, by the human curator, the identified pronunciations of the spoken words or phrases having confidence scores below the predetermined threshold value to the list of pronunciations of benchmark words or phrases stored in the files on the computer.

20. The system of claim 15, wherein the audio track for one of the selected human language tutorial videos includes pronunciations of words or phrases from multiple human languages, dialects, or human accents.

\* \* \* \* \*